United States Patent [19]
Viskochil

[11] Patent Number: 5,672,927
[45] Date of Patent: Sep. 30, 1997

[54] MOTOR WITH OVERMOLD COIL SUPPORT

[75] Inventor: Stephen Viskochil, Los Gatos, Calif.

[73] Assignee: Quantum Corporation, Milpitas, Calif.

[21] Appl. No.: 490,962

[22] Filed: Jun. 15, 1995

[51] Int. Cl.⁶ .................. H02K 1/00; H02K 11/00; H02K 1/12

[52] U.S. Cl. .................. 310/194; 310/71; 310/254

[58] Field of Search .................. 310/194, 51, 71, 310/89, 254, 67 R; 360/99.08

[56] References Cited

U.S. PATENT DOCUMENTS

| | | | |
|---|---|---|---|
| 3,780,323 | 12/1973 | Swain | 310/43 |
| 4,132,913 | 1/1979 | Lautner et al | 310/68 C |
| 4,853,575 | 8/1989 | Lessig, III | 310/171 |
| 4,900,968 | 2/1990 | Feigel et al. | 310/260 |
| 4,975,611 | 12/1990 | Rochester | 310/194 |
| 5,073,735 | 12/1991 | Takagi | 310/71 |
| 5,097,168 | 3/1992 | Takekoshi et al. | 310/254 |
| 5,200,866 | 4/1993 | Fruge et al. | 360/99.08 |
| 5,237,471 | 8/1993 | Cap et al. | 360/97.01 |
| 5,254,892 | 10/1993 | Bosman et al. | 310/49 R |

*Primary Examiner*—Steven L. Stephan
*Assistant Examiner*—Michael Wallace, Jr.
*Attorney, Agent, or Firm*—John C. Chen

[57] ABSTRACT

A motor assembly integrates a motor mounting structure and electrical connection parts achieving reduced motor component count and assembly cost. The motor assembly includes a mounting structure integrally formed into a motor coil support with plastic overmold. A plurality of connector pins are molded into the coil support for electrically coupling the motor to a printed circuit board (PCB).

10 Claims, 7 Drawing Sheets

MOTOR WITH OVERMOLD COIL SUPPORT

SUMMARY OF THE INVENTION

The present invention relates to the field of electrical motors. More particularly, the present invention relates to an improved motor stator coil support including mounting legs and a plurality of straight through-pin connectors as an integral part thereof for reducing the overall cost of and component count in mounting an electrical motor assembly onto a baseplate.

BACKGROUND OF THE INVENTION

DC motors, particularly of the brushless variety, are used in a number of applications requiring precisely constant rotation, for example, in magnetic disk drives. In a disk drive application, an electronically-commutated brushless DC motor includes a stator coil assembly commonly mounted inside of a rotating hub of a spindle motor-disk hub assembly. The rotating hub includes an outer rotor permanent magnet ring having alternate permanently magnetized segments outside of the central stator coil assembly. The stator coil assembly typically includes a stationary circular array of slotted laminar pole pieces carrying a plurality of electrical coils usually wound about radial axes, and electrically connected in a multi-phase circuit arrangement. In some spindles, a shaft and hub are axially mounted on and rotate together about a stationary tubed bearing sleeve carrying bearings and integral with or secured to the base of the disk drive, known as the "baseplate". In other spindle shaft assemblies, the shaft is a stationary member secured to the baseplate, and the hub is mounted by bearings to the shaft.

In the continuing demand for a lower cost disk drive, manufacturers have had to constantly find ways to decrease manufacturing costs within the various sub-systems of the disk drive. For example, within the spindle motor-disk hub assembly, the trend has been to integrate parts such as the stator mounting in the brushless DC motor, to reduce the overall disk drive component count and cost.

Figure 1:
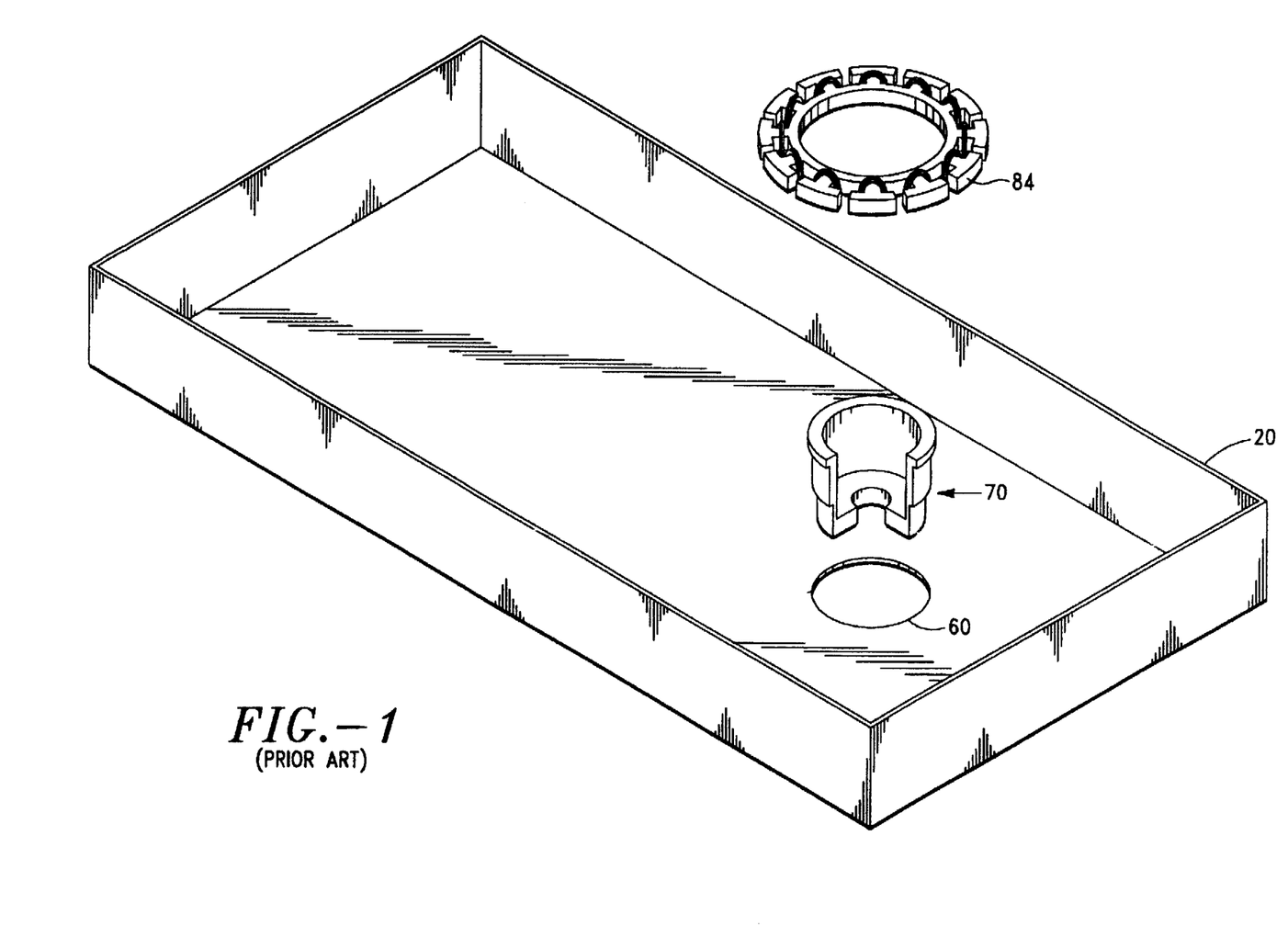
FIG. 1 is an exploded isometric view of a first prior art motor stator coil mounting arrangement, shown with a baseplate.

In a disk drive spindle motor of the prior art, shown in FIG. 1, the motor stator mounting assembly includes a stator mounting cup 70, (shown in a partial cross sectional view), which is typically press fit into a mounting hole 60 in a tub style baseplate 20, and the stator 68 which is epoxy-mounted to the mounting cup 70. The disadvantage of this assembly is that it requires an extraneous number of assembly parts and steps in mounting the motor into the baseplate.

Commonly owned U.S. Pat. No. 5,200,866 discloses a similar example using the above described mounting cup arrangement of mounting the motor to the baseplate.

Figure 2:
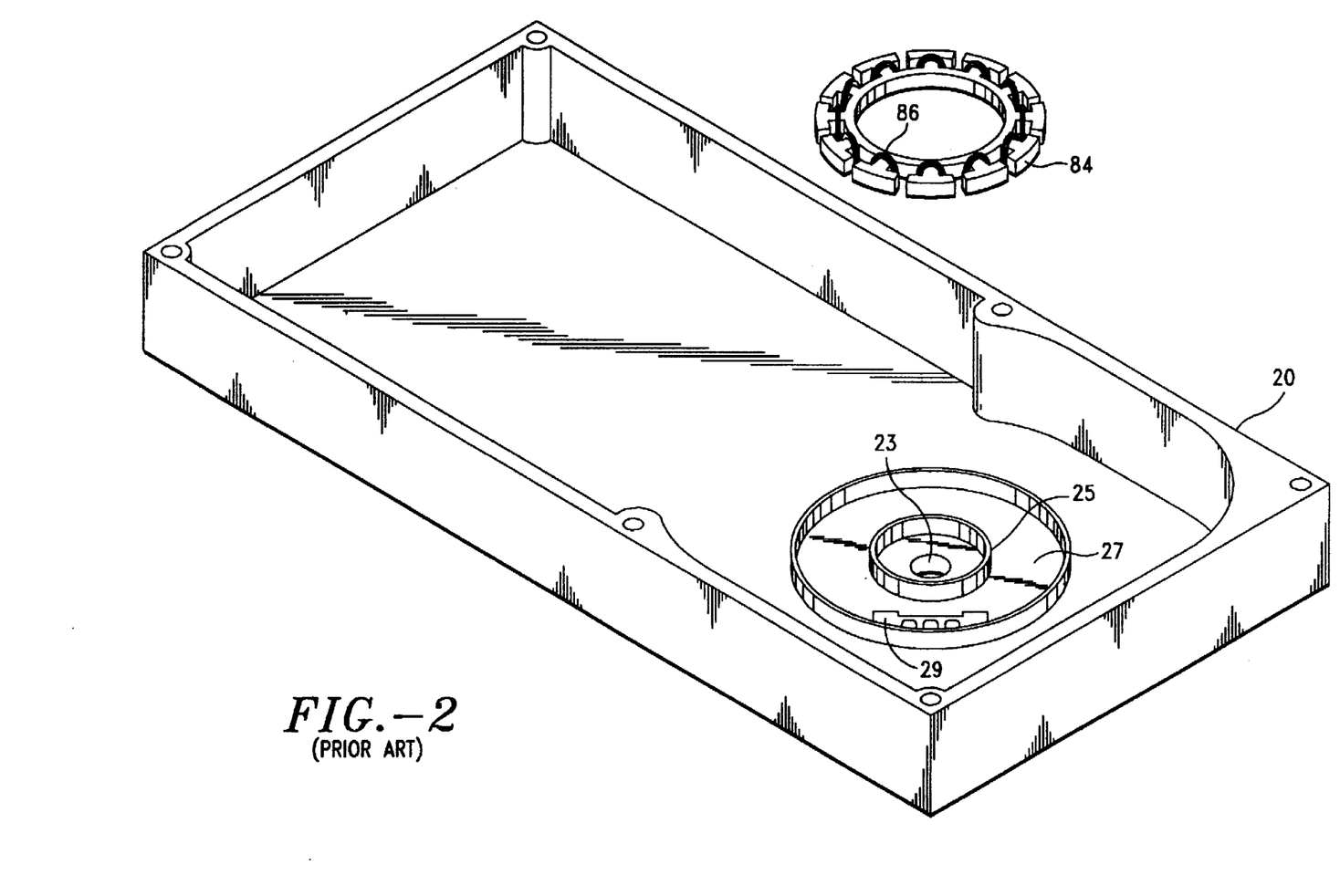
FIG. 2 is an exploded isometric view of a second prior art motor stator coil mounting arrangement, shown with a baseplate.

In another prior art motor mounting arrangement shown in FIG. 2, a motor mounting cup 25 is formed integrally into the baseplate 20 and concentric with a recessed stator mounting area 27 and a mounting hole 23 for a spindle shaft. The stator mounting area 27 is lined with an insulation layer which protects the coils from scraping against the baseplate and prevents possible damage to the wires. Stator 84 is epoxy-mounted to mounting cup 25 then electrically connected to the electronic circuit subassembly. The advantage of this arrangement is that the mounting cup 25 is formed into the baseplate, reducing the overall assembly component count. The disadvantages are the added costs of forming the mounting cup 25 into the baseplate and the assembly steps in electrically connecting the DC motor to the electronic circuitry sub-assembly. Typically, these steps include hand soldering the wires from each motor coil 86 to a small motor PCB 29 epoxy-mounted within stator mounting area 27.

Figure 3:
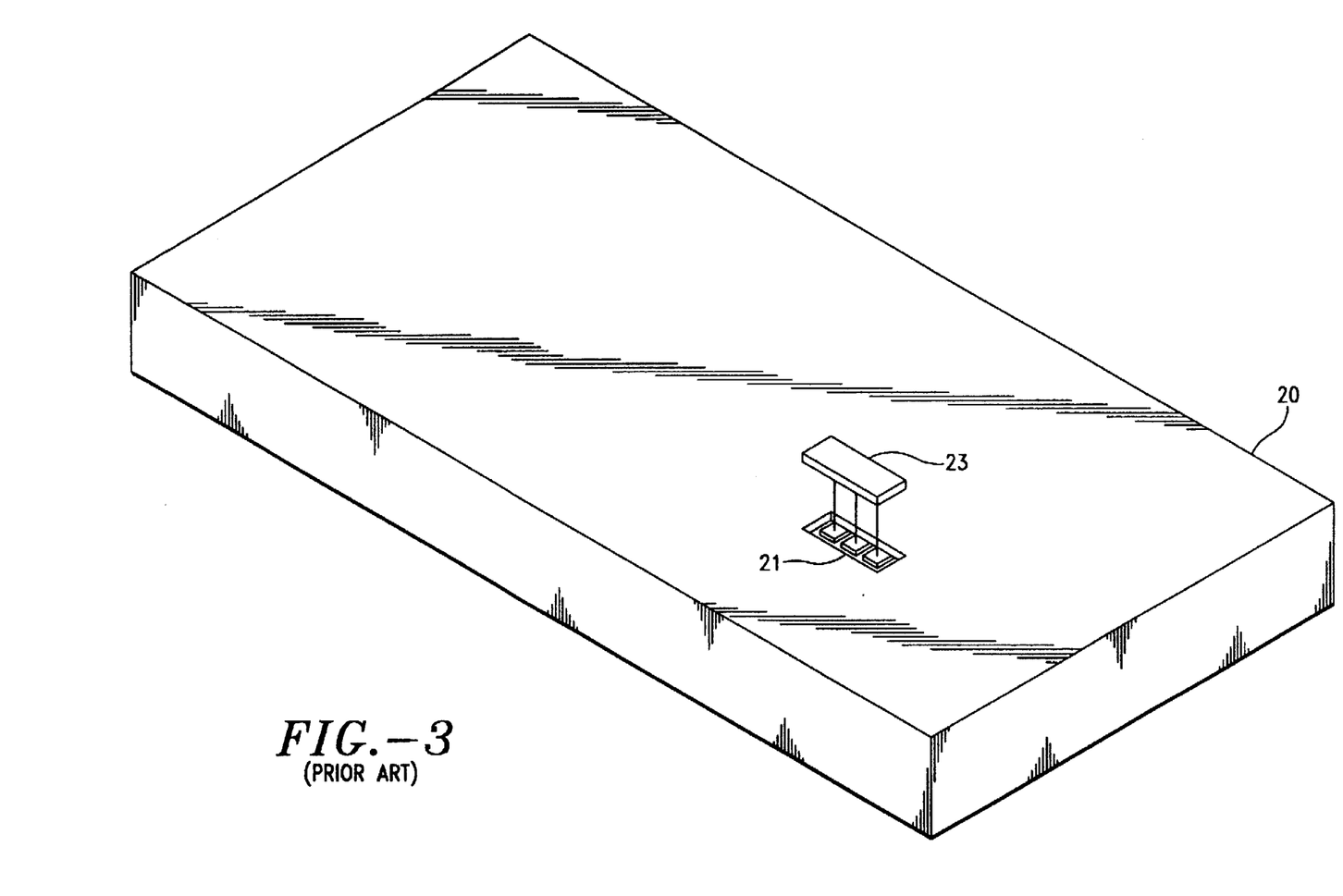
FIG. 3 is an isometric view of the back side of the baseplate of FIG. 2.

Then, as shown in FIG. 3, an elastomeric connector 23 is placed into connector hole 21, on the backside of baseplate 20, to electronically connect the motor PCB 23 to a main removable PCB (not shown).

Thus, a hitherto unsolved need has remained for a motor mounting assembly which combines the functions of the motor mounting cup and the motor PCB in a cooperative, synergistic manner and to reduce overall motor mounting components count, prime cost, assembly costs and overall complexity.

SUMMARY OF THE INVENTION WITH OBJECTS

A general object of the present invention is to provide a simplified and unified motor stator coil mounting structure in a manner overcoming limitations and drawbacks of the prior art.

Another object of the present invention is to provide a disk drive spindle motor coil support having an overmold which integrates a motor stator assembly mounting structure, thereby eliminating the need for a separate motor mounting portion and reducing the overall disk drive assembly component count, assembly complexity, and cost of assembly.

Another object of the present invention is to provide a motor coil support having an overmold which integrates a motor stator assembly mounting structure, thereby eliminating the need for a separate motor mounting portion and reducing the overall assembly component count, assembly complexity, and cost of assembly.

A further object of the present invention is to provide a motor coil support having an overmold which integrates electrical connecting parts into the overmold thereby eliminating the need for hand soldering motor coil wires to a motor PCB and further reducing the overall motor mounting component count and cost.

Another object of the present invention is to provide a motor coil support having an overmold which eliminates the need for an elastomeric connector to electrically connect the motor PCB, thereby further reducing the overall assembly component count and cost of assembly.

In accordance with a feature of this invention, a plurality of mounting legs is integrally formed into the motor coil support for mounting the motor onto a baseplate.

In accordance with another feature of this invention, a plurality of connector pins extends from the motor coil support overmold for electrically coupling the spindle motor with a main PCB.

In accordance with yet another feature of this invention, the motor is mounted on a baseplate essentially comprising a flat sheet metal plate.

These and other objects, advantages, aspects and features of the present invention will be more fully understood and appreciated upon consideration of the following detailed description of a preferred embodiment, presented in conjunction with the accompanying drawings.

DETAILED DESCRIPTION OF A PREFERRED EMBODIMENT

The details of construction of disk drives in which the invention finds utility, including the assembly of the read/write head subsystem, disk stack assembly, electronic circuitry, and the rotary voice coil head positioning servo-mechanism are well known to those skilled in the art, and thus, are not included herein. The following description provides only such detail as is necessary to teach the best mode of the present invention, and is necessary to enable those skilled in the art to practice the invention.

Figure 4:
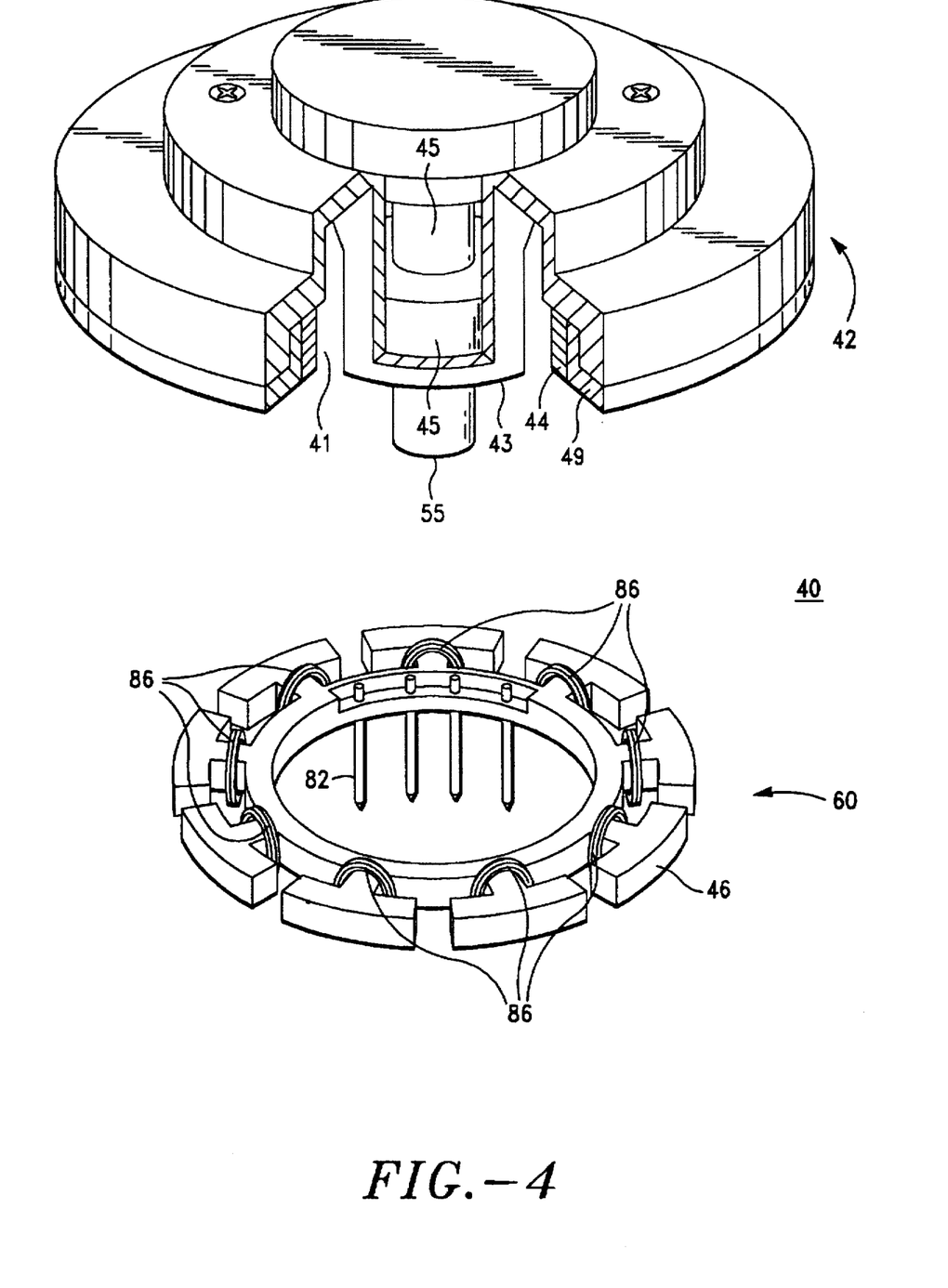
FIG. 4 is an enlarged and exploded isometric view of the motor of the present invention.

With reference to FIG. 4, a motor 40 of the present invention is shown in an exploded view. The motor 40 includes a hub assembly 42 and a stator coil assembly 60. The partial cross sectional view of disk hub 42 shows the hub assembly 42 mounted to a bearing sleeve 43 which is rotatably mounted by two ball bearing assemblies 45 to a stationary shaft 55. Flux return ring 49 is attached along circumferential lower lip 41 of hub assembly 42 and is preferably formed of a ferromagnetic material. A permanent magnet ring 44 of a ceramic or bonded composite material having hard magnetic properties (e.g. a bonded neodymium, iron, boron magnet) is attached to the inner circumferential wall of the flux return ring 49 by e.g. a suitable adhesive. The integral arrangement of disk hub 42 enables a simple and efficient assembly.

Permanent magnet ring 44 is magnetized with alternating discrete regions of oppositely polarized magnetic domains having a predetermined even integer number of polar faces oppositely confronting poles and slots of the stator coil assembly 60. In one preferred arrangement said to reduce cogging torque, there are eight polar faces of the magnet ring 44, and nine slots between coils 86 of the stator coil assembly 60.

Stator coil assembly 60 includes nine motor coils 86 that are wound about the magnetic poles of an overmolded coil support 46, connector pins 82 and a series of mounting legs 83 (shown in FIG. 5) which are integrally formed with coil support 46.

Figure 5:
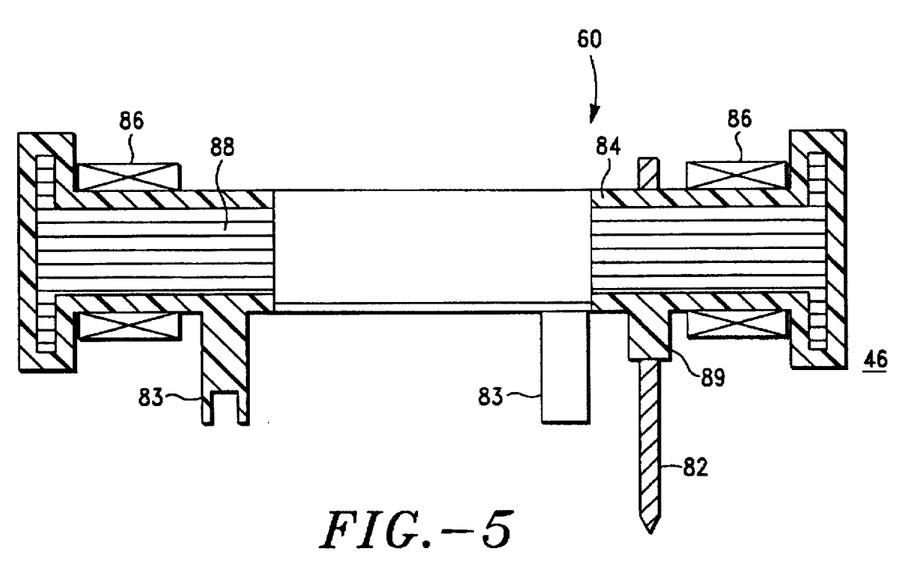
FIG. 5 is a cross sectional view of the stator shown in FIG. 4.

In the FIG. 5 cross sectional view of stator 60, coil support 46 comprises a magnetically soft lamination stack 88 overmolded with plastic overmold 84. The ferromagnetic lamination stack 88 is generally formed of insulated layers of steel sheets. Plastic overmold 84 is preferably made of a liquid crystal polymer which provides the desired properties to enable proper molding and electrical insulation. Mounting legs 83 are integrally formed with plastic overmold 84. In the preferred embodiment, three mounting legs 83 are spaced apart in a tripod arrangement which provides mounting stability. Each of the legs 83 also defines a recessed area 81 for receiving a mounting peg, post, screw, etc., (not shown) to securely mount the stator coil assembly 60 to the baseplate 50 by screwing, heat staking, epoxy, etc. (shown in FIG. 7).

Four connector pins 82 are molded into coil support 46 in an arrangement which enables the motor coils 86 to be connected at one end of the pins 82, thereby eliminating an extraneous step of hand soldering the motor coils 86 to a motor PCB (shown in FIG. 2), also as taught by the prior art. Coil support 46 also includes a connector pin support portion 89 which enables coil support 46 to be mounted to a baseplate 50 (FIG. 6) in the same relative orientation. While in the preferred example of FIG. 5 the coil support 46 is preferably overmolded by plastic injection molding process, those skilled in the art will appreciate that embodiments of the present invention may be provided for use employing other methods of plastic molding.

Figure 6:
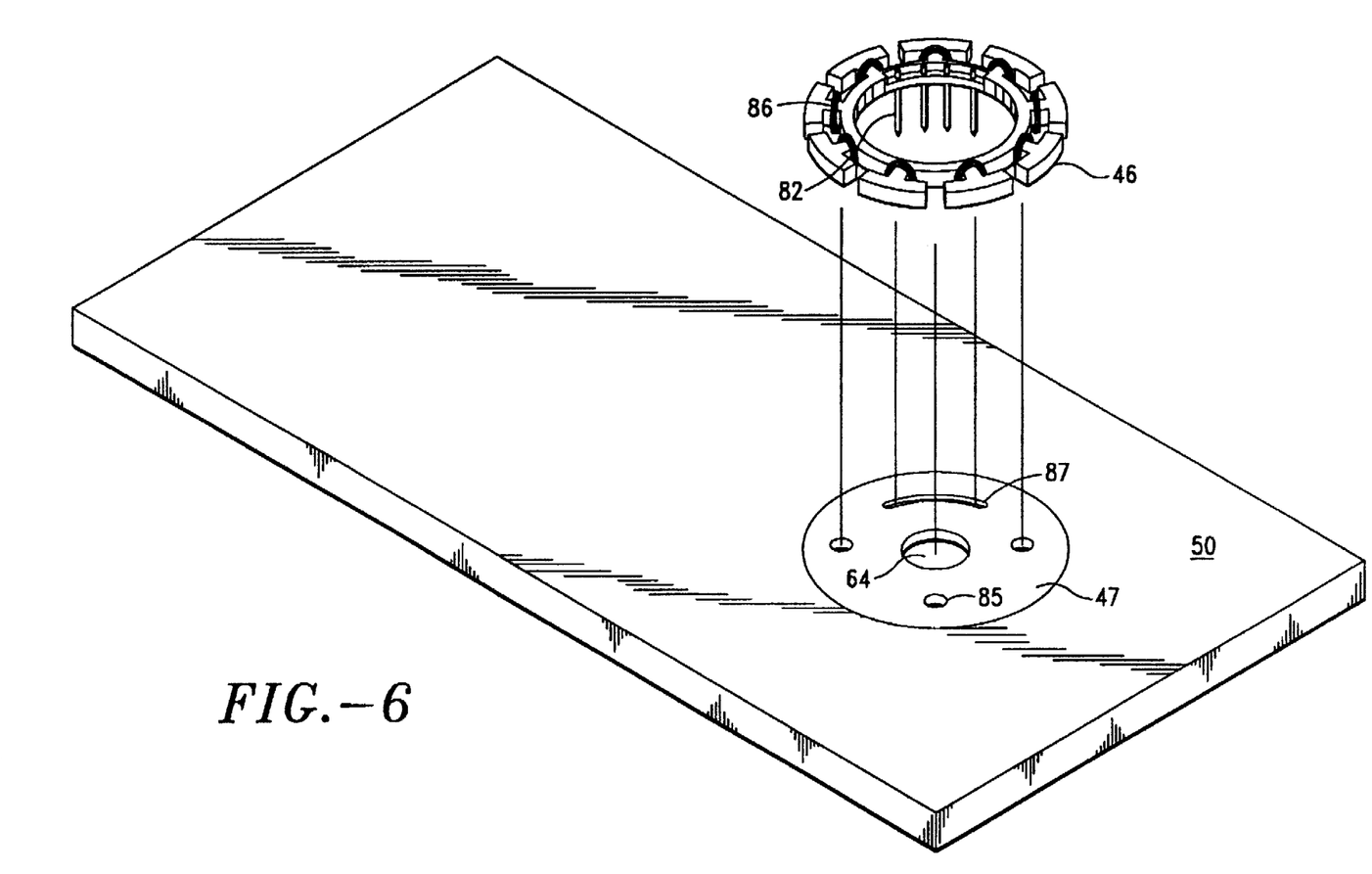
FIG. 6 is an exploded isometric view of the motor stator coil mounting arrangement of FIG. 4.

FIG. 6 shows the mounting arrangement of stator coil assembly 60 in baseplate 50. Mounting leg holes 85 are defined in baseplate 50 and arranged in a pattern aligned with the tripod arrangement of the legs 83, enabling the stator coil assembly 60 to be easily inserted into baseplate 50 in a consistent relative orientation. Baseplate 50 also includes a connector pin hole 87 aligned with connector pin support portion 89 enabling the support portion 89 to be inserted in the same relative orientation. Thus, the mounting legs 83 and connector pin support portion 89 eliminate the need for a stator coil mounting cup or other special mounting features in the baseplate as required by the prior art. The baseplate 50 further includes a sheet of insulation film material 47, which protects the coils 86 from scraping against the baseplate 50 and possibly breaking or shorting the wires to the baseplate 50. The insulation film 47 is epoxied to the baseplate 50 in an area where the coil assembly is to be mounted and is provided with mounting leg holes 85 and connector pin hole 87 aligned with those on baseplate 50. Alternatively, the insluation film may be formed as a ring or annulus and placed under the coil wire portion of the stator coil assembly 60.

This arrangement further enables the other end of the pins 82 to be inserted through connector pin hole 87, into a main PCB (not shown), thereby eliminating the use of the elastomeric connector (shown in FIG. 3), as taught by the prior art. While in the preferred example of FIG. 5 the connector pins 82 are molded into overmold 84, those skilled in the art will appreciate that embodiments of the present invention may be provided for use employing other methods of extending connector pins 82 from coil support 46, such as soldering or epoxy-mounting pins 82 to coil support 46.

While in the preferred example of FIG. 6 the flat baseplate is preferably formed of sheet metal, those skilled in the art will appreciate that embodiments of the present invention may be provided for use employing bases formed by casting stamping, extrusion or any other suitable base fabrication method.

Figure 7:
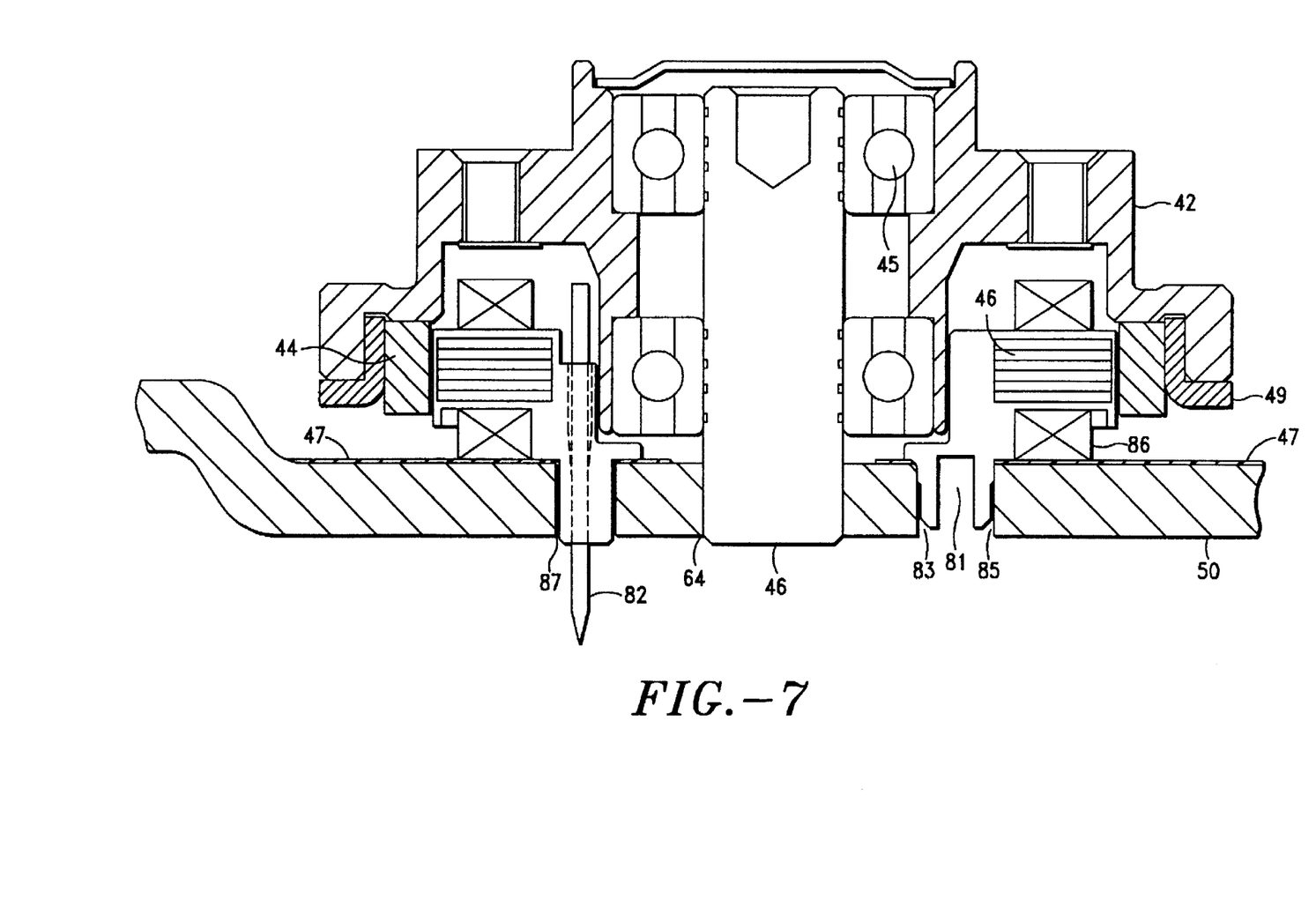
FIG. 7 is a cross sectional view of the FIG. 4 motor, shown mounted into a baseplate.

FIG. 7 shows the motor 40 of the present invention mounted into baseplate 50. The assembly procedure consists of inserting the connector pins 82 and the mounting legs 83 through their respective mounting holes, 87 and 85, in baseplate 50. The stator coil assembly 60 is then epoxied, screwed or heat-staked to the baseplate, on the insulation film 47. The hub assembly 42 is then mounted over the stator assembly 60 by press fitting shaft 46 into shaft mounting hole 64. This arrangement enables the motor assembly to be assembled in a simplified procedure which is less labor cost intensive and preferred over those taught by the prior art.

Having thus described an embodiment of the invention, it will now be appreciated that the objects of the invention have been fully achieved, and it will be understood by those skilled in the art that many changes in construction and widely differing embodiments and applications of the invention will suggest themselves without departing from the spirit and scope of the invention. The disclosure and the description herein are purely illustrative and are not intended to be in any sense limiting.

What is claimed is:

1. A motor, comprising:

a hub having a rotor axis and a flux return ring coaxially attached within the hub;

a rotor comprising a permanent magnet ring concentrically attached to the flux return ring;

a bearing assembly formed integrally within the hub, supporting the hub for rotation about a stationary shaft;

a stator comprising a plastic motor coil support and plural spaced apart electrical coils wound about a series of stator laminations encapsulated by the coil support, the coils being arranged in a circular pattern around the rotor axis and each coil being spaced separated from an adjacent other coil by a slot in the series of stator laminations;

at least one connector pin secured to the motor coil support and electrically connected to selected ones of the coils, the at least one connector pin being insertable through an aligned opening defined in a motor supporting substrate and for electrically coupling the motor to a printed circuit board mounted beneath the motor supporting substrate; and a plurality of spaced apart mounting legs formed integrally with the motor coil support, for supporting the stator in a spaced apart position relative to the motor support substrate, the legs being insertable through aligned holes defined in the supporting substrate.

2. The motor set forth in claim 1 wherein the mounting legs comprises three legs arranged in a triangular arrangement.

3. The motor set forth in claim 1 wherein the motor supporting substrate essentially comprises a flat sheet metal plate.

4. The motor set forth in claim 1 wherein the stator is mounted on an insulation film attached to the motor supporting substrate.

5. The motor set forth in claim 1 wherein the stationary shaft is integrally disposed within the hub.

6. The motor set forth in claim 1 wherein the series of stator laminations comprises a steel lamination stack and the motor coil support comprises a plastic overmolded structure.

7. The motor set forth in claim 6 wherein the plastic overmolded structure is formed by plastic injection molding.

8. The motor set forth in claim 6 wherein the plastic overmold is made of liquid crystal polymer.

9. A polyphase brushless DC electric motor having reduced overall component count and manufacturing costs, comprising:

a hub having a rotor axis and a flux return ring coaxially attached within the hub;

a rotor comprising a permanent magnet ring concentrically attached to the flux return ring;

a bearing assembly formed integrally within the hub, supporting the hub for rotation about a stationary shaft;

a stator comprising a plastic overmolded motor coil support and a plurality of electrical coils wound about a series of stator laminations encapsulated by the coil support, the coils being arranged in a circular pattern around the rotor axis;

connector pins attached to the motor coil support and connected to the coils for electrically coupling the motor to a printed circuit board mounted beneath a baseplate;

mounting legs integrally formed with the motor coil support, for spacing the motor coil support away from the baseplate; and a connector pin support portion integrally formed with the motor coil support, the support portion and the mounting legs for mounting the stator onto the baseplate in a consistent relative orientation.

10. A disk drive spindle motor, the motor being mountable about a disk drive baseplate, the motor comprising:

a hub having a rotor axis and a flux return ring coaxially attached within the hub;

a rotor comprising a permanent magnet ring concentrically attached to the flux return ring;

a bearing assembly formed integrally within the hub, supporting the hub for rotation about a stationary shaft;

a stator comprising a plastic overmolded motor coil support and a plurality of electrical coils wound about a series of stator laminations encapsulated by the coil support, the coils being arranged in a circular pattern around the rotor axis;

connector pins attached to the motor coil support and connected to the coils for electrically coupling the motor to a printed circuit board mounted beneath the baseplate;

mounting legs integrally formed with the motor coil support, the legs for spacing the motor coil support away from the baseplate; and a connector pin support portion integrally formed with the motor coil support, the support portion and the mounting legs for mounting the stator onto the baseplate in a consistent relative orientation.

* * * * *